US010196205B2

(12) United States Patent
Betz, II et al.

(10) Patent No.: US 10,196,205 B2
(45) Date of Patent: Feb. 5, 2019

(54) EJECTOR FOR REFUSE VEHICLE

(71) Applicant: Oshkosh Corporation, Oshkosh, WI (US)

(72) Inventors: Gerard G. Betz, II, Rochester, MN (US); Yanming Hou, Pleasant Prairie, WI (US); Gregory H. McCarty, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 15/017,556

(22) Filed: Feb. 5, 2016

(65) Prior Publication Data

US 2017/0225888 A1 Aug. 10, 2017

(51) Int. Cl.

| | |
|---|---|
| ***B60P 1/00*** | (2006.01) |
| ***B65F 3/04*** | (2006.01) |
| ***B65F 3/20*** | (2006.01) |
| ***B65F 3/28*** | (2006.01) |
| *B65F 3/08* | (2006.01) |
| *B65F 3/02* | (2006.01) |
| *B65F 3/00* | (2006.01) |

(52) U.S. Cl.

CPC .............. *B65F 3/041* (2013.01); *B65F 3/201* (2013.01); *B65F 3/208* (2013.01); *B65F 3/28* (2013.01); *B65F 3/08* (2013.01); *B65F 2003/006* (2013.01); *B65F 2003/023* (2013.01); *B65F 2003/0279* (2013.01)

(58) Field of Classification Search

CPC ........................................................ B60P 1/006

See application file for complete search history.

(56) References Cited

U.S. PATENT DOCUMENTS

| | | | | |
|---|---|---|---|---|
| 3,232,463 A | | 2/1966 | Weir | |
| 4,096,959 A | * | 6/1978 | Schaffler | B65F 3/143 414/408 |
| 4,221,527 A | | 9/1980 | Morrison | |
| 4,892,454 A | | 1/1990 | Behling et al. | |
| 4,992,019 A | | 2/1991 | Behling et al. | |

(Continued)

OTHER PUBLICATIONS

U.S. Appl. No. 14/552,240, filed Nov. 24, 2014, Oshkosh Corporation.

(Continued)

*Primary Examiner* — Saul Rodriguez
*Assistant Examiner* — Willie Berry, Jr.
(74) *Attorney, Agent, or Firm* — Foley & Lardner LLP

(57) ABSTRACT

A refuse vehicle includes a chassis and a body assembly. The chassis includes a cab positioned at one end of a frame. The body assembly includes a plurality of panels configured to contain a volume of refuse therein, a ramp, and an ejector. The plurality of panels define a longitudinal direction, a hopper volume and a storage volume, the ramp is disposed within the hopper volume, and the ejector is configured to fully eject refuse from the storage volume. The ejector includes a wall at least partially defining an opening within a plane and a panel pivotally coupled to the wall. The panel is selectively rotatable relative to the wall between a closed position and an open position, the panel spanning the opening when selectively rotated into the closed position and angularly offset relative to the plane of the opening when selectively rotated into the open position.

20 Claims, 13 Drawing Sheets

(56) References Cited

U.S. PATENT DOCUMENTS

| | | | | |
|---|---|---|---|---|
| 5,722,810 | A | 3/1998 | Young et al. | |
| 5,782,596 | A | 7/1998 | Young et al. | |
| 5,951,235 | A | 9/1999 | Young et al. | |
| 6,120,235 | A | 9/2000 | Humphries et al. | |
| 6,231,294 | B1 | 5/2001 | Young et al. | |
| 6,290,450 | B1 | 9/2001 | Humphries et al. | |
| 6,315,515 | B1 | 11/2001 | Young et al. | |
| 6,336,783 | B1 | 1/2002 | Young et al. | |
| 6,447,239 | B2 | 9/2002 | Young et al. | |
| 6,494,665 | B1 | 12/2002 | Bingman | |
| 6,527,495 | B2 | 3/2003 | Humphries et al. | |
| 6,565,305 | B2 | 5/2003 | Schrafel | |
| 6,722,839 | B2 | 4/2004 | Bingman | |
| 7,070,382 | B2 | 7/2006 | Pruteanu et al. | |
| 7,207,582 | B2 | 4/2007 | Siebers et al. | |
| 7,284,943 | B2 | 10/2007 | Pruteanu et al. | |
| 7,489,098 | B2 | 2/2009 | Harris et al. | |
| 7,556,468 | B2 | 7/2009 | Grata | |
| 7,559,735 | B2 | 7/2009 | Pruteanu et al. | |
| 7,671,547 | B2 | 3/2010 | Addleman | |
| 7,683,564 | B2 | 3/2010 | Harris et al. | |
| 7,878,750 | B2 | 2/2011 | Zhou et al. | |
| 7,909,561 | B2 | 3/2011 | Addleman et al. | |
| 7,997,852 | B1 * | 8/2011 | Campbell ............... | B65F 3/201<br>414/812 |
| 8,182,194 | B2 | 5/2012 | Pruteanu et al. | |
| 8,360,706 | B2 | 1/2013 | Addleman et al. | |
| 8,540,475 | B2 | 9/2013 | Kuriakose et al. | |
| 8,739,892 | B2 | 6/2014 | Moore et al. | |
| 8,807,613 | B2 | 8/2014 | Howell et al. | |
| 9,139,409 | B2 | 9/2015 | Perron | |
| 9,145,905 | B2 | 9/2015 | Hou | |
| 9,216,856 | B2 | 12/2015 | Howell et al. | |
| 9,302,129 | B1 | 4/2016 | Betz et al. | |
| 9,327,150 | B2 | 5/2016 | Moore et al. | |
| 9,328,986 | B1 | 5/2016 | Pennau et al. | |
| 2007/0138817 | A1 | 6/2007 | Calliari et al. | |
| 2007/0154295 | A1 | 7/2007 | Kuriakose | |
| 2008/0038106 | A1 | 2/2008 | Spain | |
| 2012/0282077 | A1 | 11/2012 | Alberts et al. | |
| 2015/0016931 | A1 | 1/2015 | Kuriakose et al. | |
| 2015/0033962 | A1 | 2/2015 | Schwartz et al. | |
| 2015/0175353 | A1 | 6/2015 | Gillmore et al. | |
| 2015/0232269 | A1 | 8/2015 | Hou | |
| 2015/0259185 | A1 | 9/2015 | Ditty | |
| 2016/0009231 | A1 | 1/2016 | Perron et al. | |

OTHER PUBLICATIONS

U.S. Appl. No. 14/552,252, filed Nov. 24, 2014, Oshkosh Corporation.

U.S. Appl. No. 14/552,275, filed Nov. 24, 2014, Oshkosh Corporation.

U.S. Appl. No. 14/552,283, filed Nov. 24, 2014, Oshkosh Corporation.

U.S. Appl. No. 14/552,293, filed Nov. 24, 2014, Oshkosh Corporation.

U.S. Appl. No. 14/928,907, filed Nov. 13, 2015, Oshkosh Corporation.

* cited by examiner

EJECTOR FOR REFUSE VEHICLE

BACKGROUND

Refuse vehicles collect a wide variety of waste, trash, and other material from residences and businesses. Operators of the refuse vehicle transport the material from various waste receptacles within a municipality to a storage or processing facility (e.g., a landfill, an incineration facility, a recycling facility, etc.). To reduce the requisite number of trips between the waste receptacles and the storage or processing facility, the refuse may be emptied into a collection chamber (e.g., a hopper) of the refuse vehicle and thereafter compacted into a storage chamber. Such compaction reduces the volume of the refuse and increases the carrying capacity of the refuse vehicle. The refuse is compacted in the collection chamber by an ejector that is forced against the refuse by actuators (e.g., pneumatic cylinders, hydraulic cylinders). Traditional refuse vehicles with collection chambers and storage chambers of differing widths are dump body configurations where refuse is removed from the storage chamber by raising the front end of the body.

SUMMARY

One embodiment of the invention relates to a refuse vehicle that includes a chassis and a body assembly. The chassis includes a cab positioned at one end of a frame. The body assembly is coupled to the chassis and disposed behind the cab. The body assembly includes a plurality of panels configured to contain a volume of refuse therein, a ramp, and an ejector. The plurality of panels define a longitudinal direction, a hopper volume, and a storage volume, the ramp is disposed within the hopper volume, and the ejector is configured to fully eject refuse from the storage volume. The ejector includes a wall at least partially defining an opening within a plane and a panel pivotally coupled to the wall. The panel is selectively rotatable relative to the wall between a closed position and an open position, the panel spanning the opening when selectively rotated into the closed position and angularly offset relative to the plane of the opening when selectively rotated into the open position. The ramp is positioned to direct refuse from the hopper volume toward the opening such that the refuse is compacted into the storage volume, through the opening, as the panel rotates from the open position to the closed position.

Another embodiment of the invention relates to a body assembly for a refuse vehicle that includes a plurality of panels configured to contain a volume of refuse therein, a ramp, and an ejector. The plurality of panels define a longitudinal direction, a hopper volume, and a storage volume, the ramp is disposed within the hopper volume, and the ejector is configured to fully eject refuse from the storage volume. The ejector includes a wall at least partially defining an opening within a plane and a panel pivotally coupled to the wall. The panel is selectively rotatable relative to the wall between a closed position and an open position, the panel spanning the opening when selectively rotated into the closed position and angularly offset relative to the plane of the opening when selectively rotated into the open position. The ramp is positioned to direct refuse from the hopper volume toward the opening such that the refuse is compacted into the storage volume, through the opening, as the panel rotates from the open position to the closed position.

Yet another embodiment of the invention relates to an ejector for a refuse vehicle. The ejector includes a wall at least partially defining an opening within a plane, a panel pivotally coupled to the wall, and an actuator positioned to rotate the panel between the closed position and the open position. The panel is selectively rotatable relative to the wall between a closed position and an open position, the panel spanning the opening when selectively rotated into the closed position and angularly offset relative to the plane of the opening when selectively rotated into the open position. The actuator is coupled to the wall at a first attachment point and coupled to the panel at a second attachment point such that the wall, the panel, and the actuator form a self-contained ejection system.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
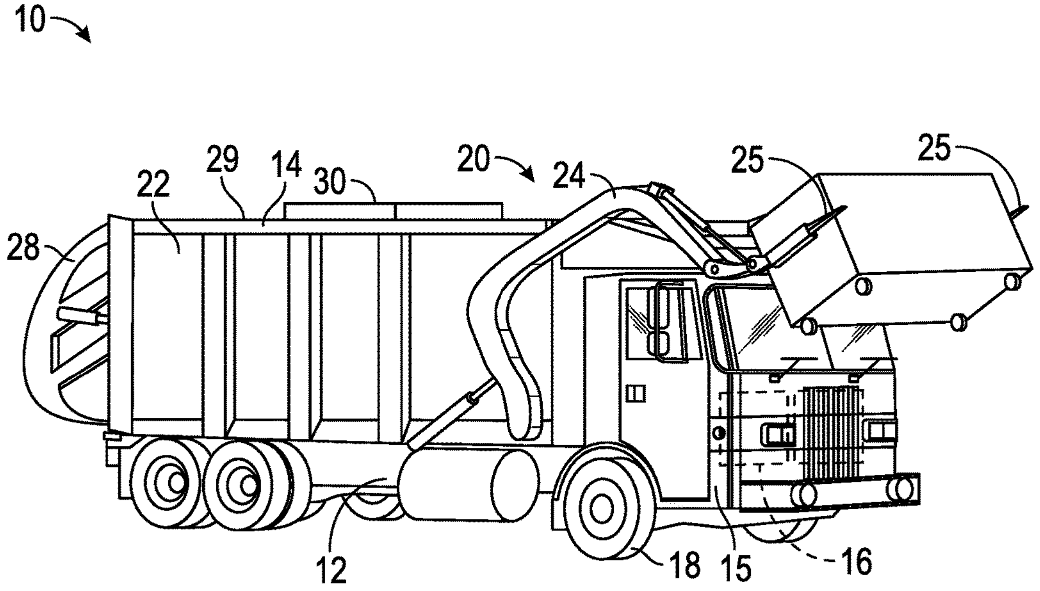
FIG. 1 is a perspective view of a front-loading refuse vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a refuse vehicle includes an ejector assembly specifically designed to accommodate even refuse bodies with a hopper volume and a storage volume of differing widths. The ejector assembly includes a wall and a movable (e.g., rotatable, etc.) panel that is actuated to first compact refuse from the hopper volume into the storage volume. The ejector assembly is thereafter actuated to compact refuse within the storage volume. Refuse vehicles with hopper and storage volumes of differing shapes and widths may be particularly useful to accommodate side-loading collection assemblies, which are inset relative to the storage volume to reduce the overall width of the refuse vehicle (e.g., to comply with maximum vehicle width requirements, etc.). Traditional refuse vehicles may include pendulum packing systems that compact refuse from the hopper volume. Traditional refuse vehicles may additionally or alternatively include an ejector assembly that travels through both the hopper volume and the storage volume. Where the hopper and storage volumes have different widths, the pendulum and/or ejector assembly may be sized to correspond with the width of the hopper. The pendulum and/or ejector assembly may be narrower than the storage volume and thereby not suited to eject refuse from the storage volume. Traditional refuse vehicles where the hopper and storage volumes have different widths may thereby require dump body configurations (e.g., a configuration where refuse is poured or dumped from the storage chamber by raising the front end of the body). According to an exemplary embodiment, the refuse vehicle of the present disclosure actuates the ejector assembly to fully eject refuse from the storage volume of the body assembly, thereby improving stability relative to traditional designs.

According to an exemplary embodiment, the ejector assembly is a multi-piece system where a panel (e.g., packer, paddle, etc.) rotates about an axis and is attached to a movable wall. The panel may be operated in tandem in a closed position with the movable wall of the ejector to compact refuse within the storage volume and/or push refuse from the storage volume. The panel may compact refuse deposited in the hopper by rotating between an open position and a closed position. The body assembly of the present disclosure facilitates providing common body architectures across product lines (e.g., the hopper volume can be changed on side-loading vehicles, front-loading vehicles, etc. for a particular application and/or accommodate an ejector of the present disclosure, etc.). The refuse vehicle of the present disclosure also maintains a 102 inch width during all phases of truck operation and provides organic collection capability (e.g., collection of resources such as food scraps, yard waste, compostable material, etc.) in a side-loading refuse vehicle.

Figure 2:
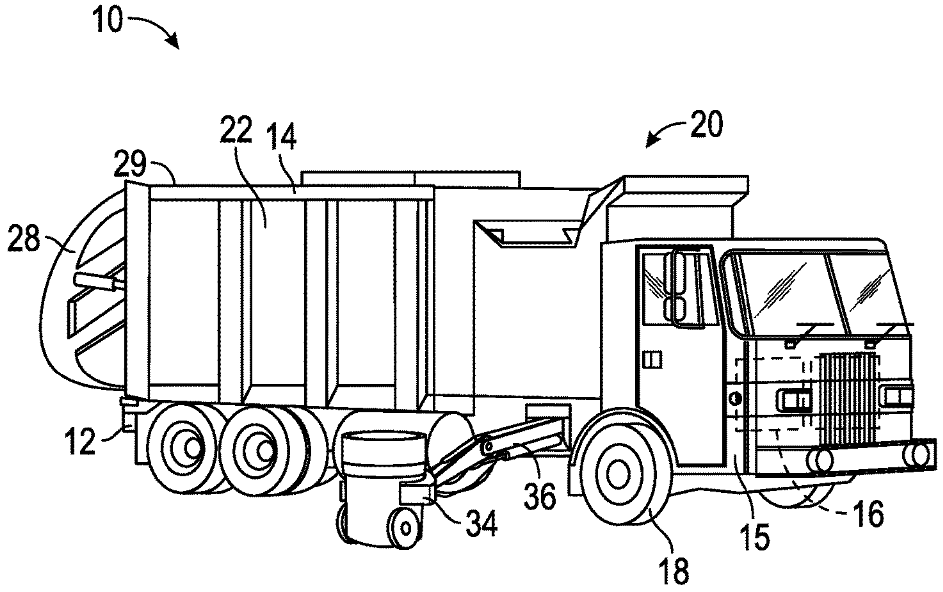
FIG. 2 is a perspective view of a side-loading refuse vehicle, according to an exemplary embodiment.

Referring to FIGS. 1-2, a vehicle, shown as refuse truck 10 (e.g., garbage truck, waste collection truck, sanitation truck, etc.), includes a chassis, shown as a frame 12, and a body assembly, shown as body 14, coupled to frame 12. As shown in FIGS. 1-2, refuse truck 10 also includes a cab 15 coupled to a front end of frame 12. Cab 15 includes various components to facilitate operation of refuse truck 10 by an operator (e.g., a seat, a steering wheel, hydraulic controls, etc.). Refuse truck 10 further includes a prime mover 16 coupled to frame 12 at a position beneath cab 15. Prime mover 16 provides power to a plurality of motive members, shown as wheels 18, and to other systems of the vehicle (e.g., a pneumatic system, a hydraulic system, etc.). Prime mover 16 may be configured to utilize a variety of fuels (e.g., gasoline, diesel, bio-diesel, ethanol, natural gas, etc.), according to various exemplary embodiments. According to an alternative embodiment, prime mover 16 is one or more electric motors coupled to frame 12. The electric motors may consume electrical power from an on-board storage device (e.g., batteries, ultra-capacitors, etc.), from an on-board generator (e.g., an internal combustion engine), or from an external power source (e.g., overhead power lines) and provide power to the systems of the refuse truck 10.

According to an exemplary embodiment, refuse truck 10 is configured to transport refuse from various waste receptacles within a municipality to a storage or processing facility (e.g., a landfill, an incineration facility, a recycling facility, etc.). As shown in FIGS. 1-2, body 14 includes a plurality of panels, shown as panels 22, a tailgate 28, and a cover 29. Panels 22, tailgate 28, and cover 29 define a collection chamber, shown as a compartment 20. Loose refuse is placed into compartment 20 where it may be thereafter compacted. Compartment 20 provides temporary storage for refuse during transport to a waste disposal site or a recycling facility. In some embodiments, at least a portion of body 14 and compartment 20 extend in front of cab 15. According to the embodiment shown in FIGS. 1-2, body 14 and compartment 20 are positioned behind cab 15. In some embodiments, compartment 20 includes a hopper volume and a storage volume. Refuse is initially loaded into the hopper volume and thereafter compacted into the storage volume. According to an exemplary embodiment, the hopper volume is positioned between the storage volume and cab 15 (i.e., refuse is loaded into a position behind cab 15 and stored in a position further toward the rear of refuse truck 10).

Referring again to the exemplary embodiment shown in FIG. 1, refuse truck 10 is a front-loading refuse vehicle. As shown in FIG. 1, refuse truck 10 includes a pair of arms 24 coupled to frame 12 on either side of cab 15. Arms 24 may be rotatably coupled to frame 12 with a pivot (e.g., a lug, a shaft, etc.). In some embodiments, actuators (e.g., hydraulic cylinders, etc.) are coupled to frame 12 and arms 24, and extension of the actuators rotates arms 24 about an axis extending through the pivot. According to an exemplary embodiment, interface members, shown as forks 25, are coupled to arms 24. Forks 25 have a generally rectangular cross-sectional shape and are configured to engage a refuse container (e.g., protrude through apertures within the refuse container, etc.). During operation of refuse truck 10, forks 25 are positioned to engage the refuse container (e.g., refuse truck 10 is driven into position until forks 25 protrude through the apertures within the refuse container). As shown in FIG. 1, arms 24 are rotated to lift the refuse container over cab 15. A second actuator (e.g., a hydraulic cylinder) articulates forks 25 to tip the refuse out of the container and into the hopper volume of compartment 20 through an opening in cover 29. The actuator thereafter rotates arms 24 to return the empty refuse container to the ground. According to an exemplary embodiment, a top door 30 is slid along cover 29 to seal the opening thereby preventing refuse from escaping compartment 20 (e.g., due to wind, etc.).

Referring to the exemplary embodiment shown in FIG. 2, refuse truck 10 is a side-loading refuse vehicle that includes a grabber 34 configured to interface with (e.g., engage, wrap around, etc.) a refuse container (e.g., a residential garbage can, etc.). According to the exemplary embodiment shown in FIG. 2, grabber 34 is movably coupled to body 14 with an arm 36. Arm 36 includes a first end coupled to body 14 and a second end coupled to grabber 34. An actuator (e.g., a hydraulic cylinder) articulates arm 36 and positions grabber 34 to interface with the refuse container. Arm 36 may be moveable within one or more directions (e.g., up and down, left and right, in and out, rotation, etc.) to facilitate positioning grabber 34 to interface with the refuse container. According to an alternative embodiment, grabber 34 is movably coupled to body 14 with a track. After interfacing with the refuse container, grabber 34 is lifted up the track (e.g., with a cable, with a hydraulic cylinder, with a rotational actuator, etc.). The track may include a curved portion at an upper portion of body 14 such that grabber 34 and the refuse container are tipped toward the hopper volume of compartment 20. In either embodiment, grabber 34 and the refuse container are otherwise tipped toward the hopper volume of compartment 20 (e.g., with an actuator, etc.). As grabber 34 is tipped, refuse falls through an opening in cover 29 and into the hopper volume of compartment 20. Arm 36 or the track then returns the empty refuse container to the ground, and top door 30 may be slid along cover 29 to seal the opening thereby preventing refuse from escaping compartment 20 (e.g., due to wind).

Figure 3:
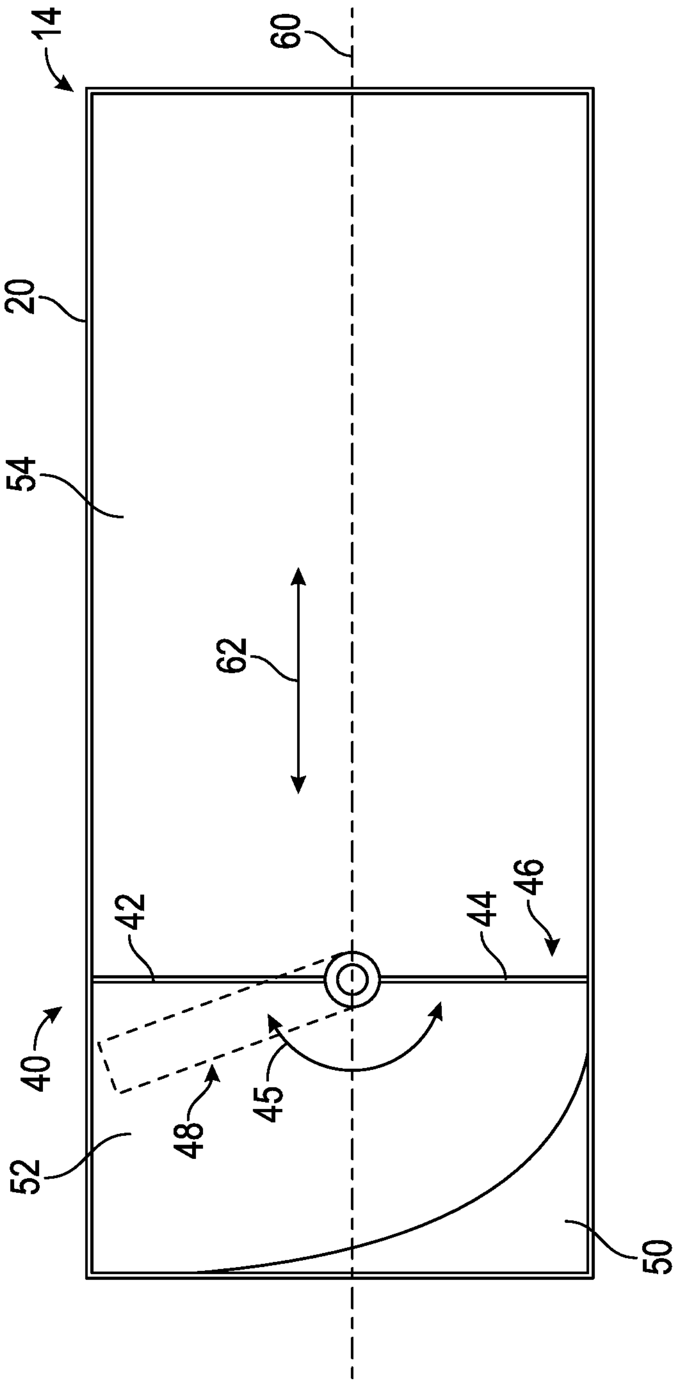
FIG. 3 is a sectional view of a body assembly of a refuse vehicle having an ejector, according to an exemplary embodiment.

Referring next to FIG. 3, an ejector assembly, shown as ejector system 40 (e.g., press, compactor, packer, etc.), is positioned within compartment 20 of body 14. According to an exemplary embodiment, ejector system 40 is at least one of configured and positioned to fully eject refuse from refuse truck 10. As shown in FIG. 3, compartment 20 defines a hopper volume, shown as hopper volume 52, and a storage volume, shown as storage volume 54. Body 14 extends along a longitudinal axis, shown as longitudinal axis 60, according to an exemplary embodiment.

According to the exemplary embodiment shown in FIG. 3, ejector system 40 is configured to compact the refuse within hopper volume 52 into storage volume 54 and thereafter compact refuse within storage volume 54 along a direction, shown as direction 62, thereby increasing the carrying capacity of the refuse truck 10. Direction 62 may extend along (e.g., be parallel with, etc.) longitudinal axis 60. As shown in FIG. 3, body 14 includes a ramp, shown as ramp 50. In some embodiments, ramp 50 is integrally formed with body 14. In other embodiments, ramp 50 is formed as a sub-component and thereafter coupled (e.g., welded, bolted, etc.) to body 14. Ramp 50 may be disposed within hopper volume 52 of body 14. According to an exemplary embodiment, ramp 50 is positioned to direct refuse from hopper volume 52 toward the storage volume for compaction by ejector system 40. In some embodiments, ejector system 40 utilizes hydraulic power to compact the refuse from hopper volume 52 into storage volume 54.

As shown in FIG. 3, ejector system 40 includes a wall, shown as wall 42, and a panel, shown as packer 44. Packer 44 is coupled to wall 42 and is selectively rotatable about an axis through a swing arc, shown as swing arc 45. Specifically, a pair of couplings 47 pivotally and fixedly couple an end of the packer 44 to the wall 42 such that the packer 44 pivots about an axis (e.g., the axis 100). According to the exemplary embodiment shown in FIG. 3, packer 44 is selectively rotatable between a closed position, shown as closed position 46, and an open position, shown as open position 48.

Figure 4:
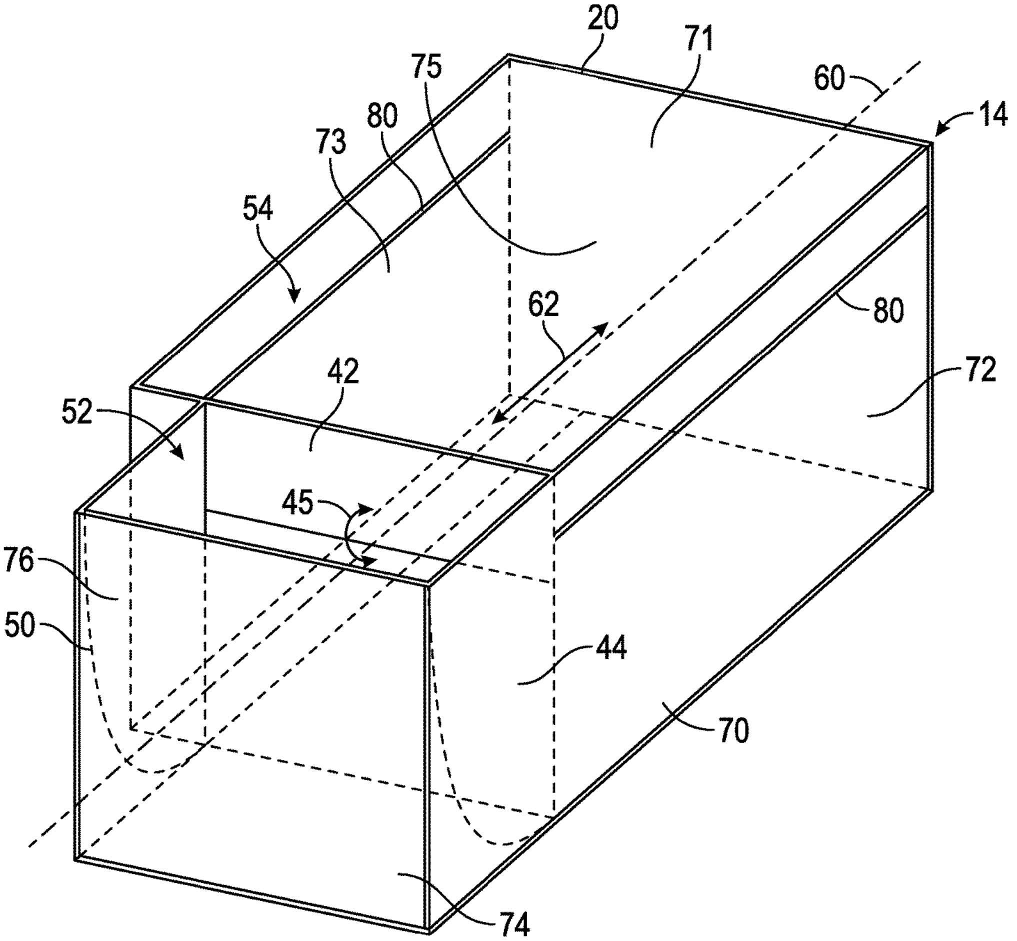
FIGS. 4 and 5 are front perspective views of the body assembly of FIG. 3.

Referring next to FIG. 4, a front perspective view of body 14 is shown. According to an exemplary embodiment, body 14 includes a plurality of panels. In some embodiments, body 14 is shaped as a generally rectangular box having two transverse upper edges, two longitudinal upper edges, two transverse lower edges, and two longitudinal lower edges. The longitudinal edges extend along the length of body 14 (e.g., the longer dimension, along longitudinal axis 60, etc.), and the transverse edges extend across the length of body 14, according to an exemplary embodiment. As shown in FIG. 4, body 14 includes a lowermost panel, shown as panel 70, an uppermost panel, shown as panel 71, a first side panel, shown as panel 72, a second side panel, shown as panel 73, a foremost panel, shown as panel 74, and a rearmost panel, shown as panel 75.

Referring again to the exemplary embodiment shown in FIG. 4, body 14 includes a floor (e.g., panel 70, etc.). In one embodiment, the floor is flat (e.g., not curved, etc.). According to an exemplary embodiment, body 14 includes a ceiling (e.g., panel 71, etc.) that is convex and curves upward. In some embodiments, panel 71 is curved along the entire length of body 14. Body 14 may include a first side panel (e.g., panel 72, etc.) and a second side panel (e.g., panel 73, etc.). Panel 72 and panel 73 may be convex and curve outward. Panel 72 and panel 73 may have the same or different curvatures. Panel 71, panel 72, and panel 73 may be curved along the entire length of body 14. In some embodiments, panel 71, panel 72, and panel 73 are curved along only a portion of the length of storage volume 54 and/or only a portion of the length of hopper volume 52. The weight of body 14 having panel 71, panel 72, and panel 73 is less than the weight of a traditional body assembly. Panel 71, panel 72, and panel 73 may provide a weight reduction in part due to the high strength-to-weight ratio of panel 71, panel 72, and panel 73 relative to traditional, flat panels. Body 14 having panel 71, panel 72, and panel 73 with an increased strength-to-weight ratio may have fewer lateral sub-frame members (e.g., cross members) and smaller longitudinal sub-frame members (e.g., ribs, rails, etc.) relative to traditional refuse bodies, decreasing the overall weight of the body 14 without decreasing the refuse-carrying capabilities of refuse truck 10. The curvature of panel 71, panel 72, and panel 73 may reduce the peak stresses acting on panel 71, panel 72, and panel 73.

In some embodiments, panel 70 is concave and curves downward. In some embodiments, panel 70 is curved along the entire length of body 14 and reduces the displacement of cantilevered portions of panel 70 during loading. According to an exemplary embodiment, panel 70 is curved in both hopper volume 52 and in storage volume 54 of compartment 20.

According to an exemplary embodiment, body 14 includes panel 76. Panel 76 is laterally offset from at least one of panel 72 and panel 73, according to an exemplary embodiment. Panel 76 may partially define hopper volume 52. In some embodiments, panel 76 and panel 73 are coplanar such that panel 76 and panel 73 form a continuous panel. Panel 73 and panel 76 may be formed as separate components and thereafter coupled (e.g., welded, bolted, etc.) together. In other embodiments, panel 76 and panel 73 are integrally formed and are defined by portions of the same panel.

According to some embodiments, hopper volume 52 has a width (e.g., a lateral distance between panel 72 and panel 76, etc.) that is smaller than a width of storage volume 54 (e.g., a lateral distance between panel 72 and panel 74, etc.). As shown in FIG. 4, wall 42 extends downward from panel 71. According to some embodiments, wall 42 does not extend to panel 70. By way of example, packer 44 may extend from a lower edge of wall 42 to panel 70.

As shown in FIG. 4, wall 42 translates within body 14 along a first track, shown as first rail 80, and a second track, shown as second rail 80. In some embodiments, first rail 80 and second rail 80 are formed by a portion of body 14. In other embodiments, first rail 80 and second rail 80 are separate components that are coupled (e.g., welded, bolted, etc.) to one or more other components of body 14. As shown in FIG. 4, first rail 80 and second rail 80 extend along the length of storage volume 54 in a direction that is parallel to longitudinal axis 60. Rails 80 may facilitate longitudinal motion of wall 42 within storage volume 54.

Wall 42 may have one or more receivers configured to interface with (e.g., slidably engage, etc.) first rail 80 and second rail 80. In one embodiment, the receivers include openings or slots configured to receive rails 80. In other embodiments, the receivers include shoes, rails, and/or projections that are received by (e.g., slot into, etc.) rails 80. The receiver may be coupled to various portions of wall 42 (e.g., positioned along a longitudinal edge of wall 42, etc.). In some embodiments, the receivers are positioned at a lower end of wall 42. In other embodiments, wall 42 includes multiple receivers on each lateral side. The receivers may be formed integrally with wall 42. In still other embodiments, the receivers are separate components that are coupled (e.g., welded, bolted, etc.) to wall 42.

Refuse is compacted within storage volume 54 with a compaction stroke. During the compaction stroke, wall 42 translates within storage volume 54 on first and second rails 80 along a longitudinal axis 60. As shown in FIG. 4, longitudinal axis 60 is parallel to the direction 62 of body 14. After the compaction stroke, wall 42 retracts by translating within storage volume 54 on rails 80.

Figure 5:
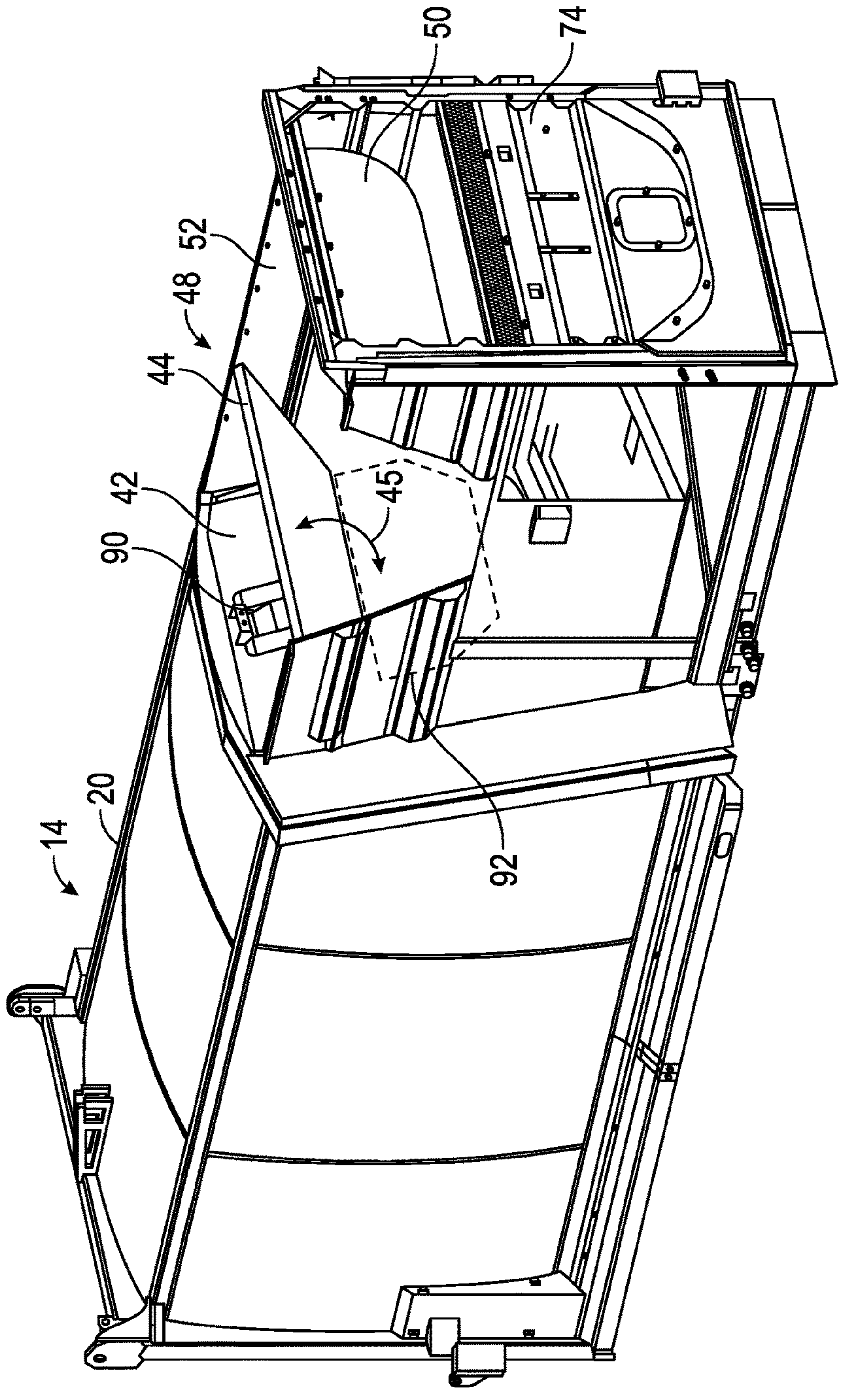
Figure 6:
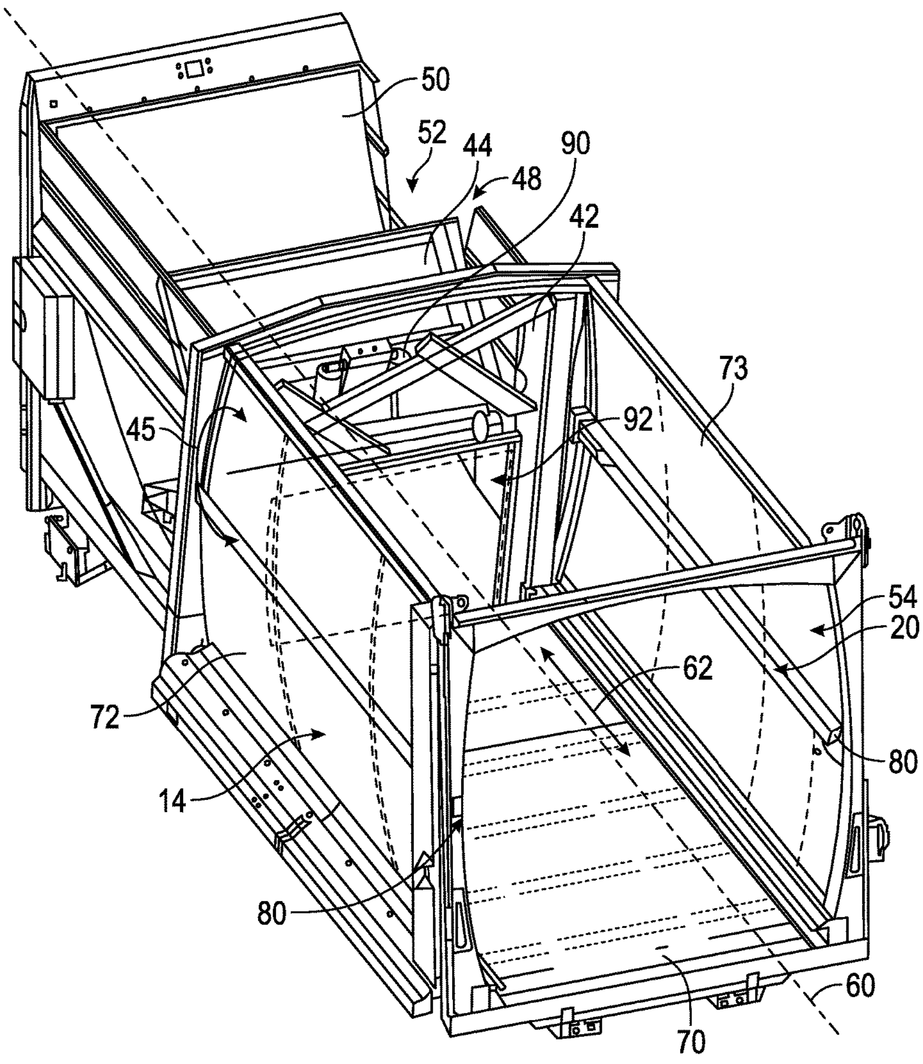
FIG. 6 is a rear perspective view of the body assembly of FIG. 3.

Referring next to the exemplary embodiment shown in FIGS. 5 and 6, wall 42 is in a retracted position (e.g., in a position toward the front of body 14, etc.), and packer 44 is in open position 48 such that refuse may be emptied into hopper volume 52 of compartment 20. As shown in FIGS. 5 and 6, ejector system 40 includes an actuator, shown as actuator assembly 90. According to an exemplary embodiment, actuator assembly 90 is positioned to selectively reposition packer 44. In some embodiments, actuator assembly 90 includes a linear actuator having a first end coupled to packer 44 and a second end coupled to wall 42.

Referring specifically to FIG. 5, a front perspective view of body 14 is shown. According to an exemplary embodiment, wall 42 at least partially defines an opening, shown as opening 92. In some embodiments, opening 92 extends from a lowermost edge of wall 42 to a floor (e.g., panel 70, etc.) of compartment 20. When selectively repositioned into closed position 46, packer 44 may at least partially close (e.g., span, be disposed over, covers, etc.) opening 92.

As shown in FIG. 5, ramp 50 is shaped to direct refuse within hopper volume 52 toward opening 92 such that the refuse is compacted into storage volume 54 through opening 92 as packer 44 rotates from open 48 to a closed position 46. Ramp 50 may be curved, angled, and/or otherwise shaped to facilitate such direction of refuse. As shown in FIG. 5, ramp 50 has a width equal to the width of hopper volume 52. Ramp 50 may be coupled (e.g., welded, bolted, etc.) to panel 74. Ramp 50 is positioned to direct refuse from the hopper volume (e.g., hopper volume 52) toward opening 92. In some embodiments, closed position 46 is angularly offset from a plane within which wall 42 extends such that packer 44 rotates through opening 92.

Referring specifically to FIG. 6, wall 42 as a width that is greater than the width of opening 92 (i.e., wall 42 is wider than opening 92, etc.). According to the exemplary embodiment shown in FIG. 6, opening 92 has a side edge that is spaced a lateral offset distance inward relative to at least one of panel 72 and panel 73. Opening 92 may have a width equal to the width of hopper volume 52.

Figure 7:
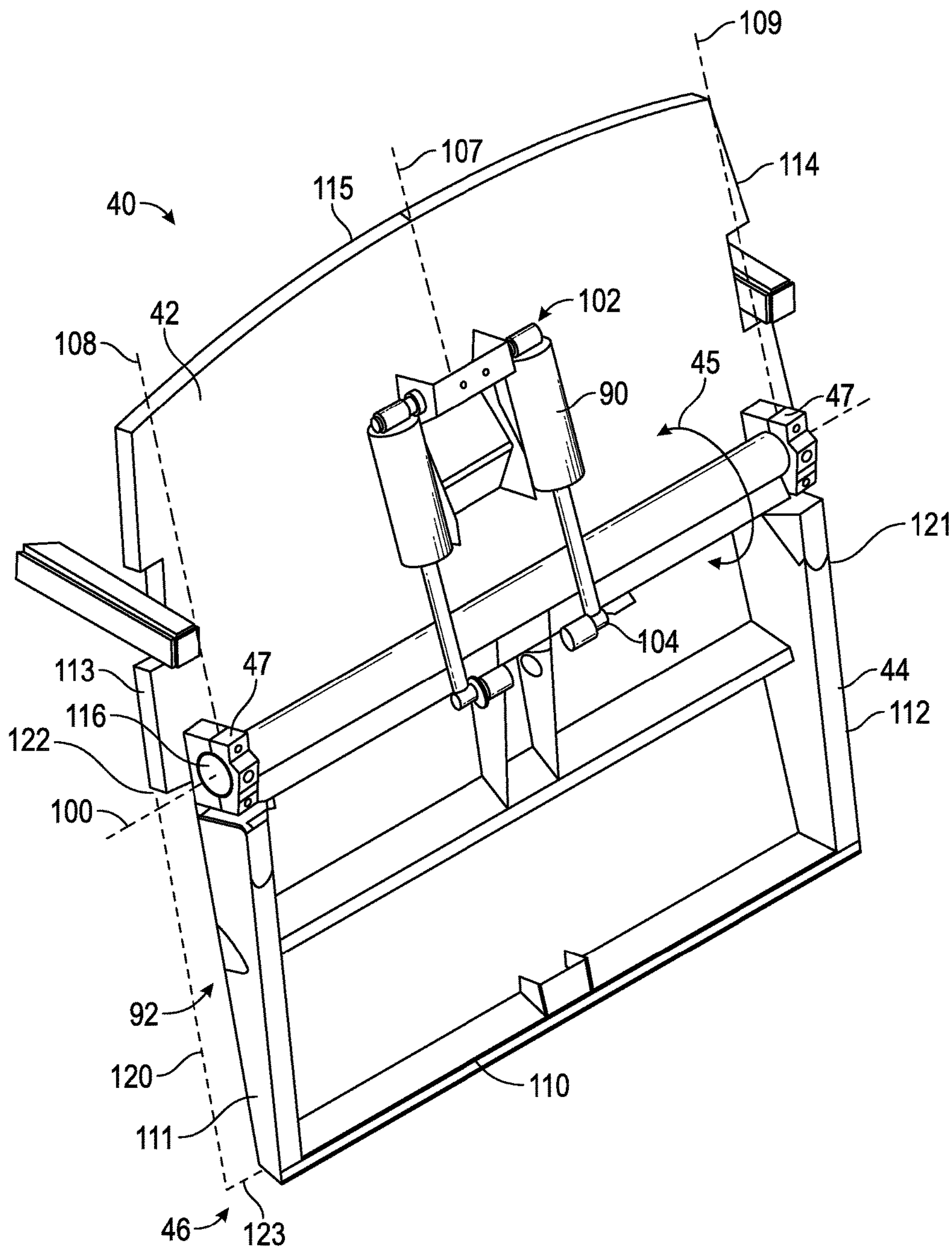
FIGS. 7-11 are front perspective views of the ejector of FIG. 3, according to various alternative embodiments.

Referring next to FIG. 7, ejector system 40 is shown configured for use with refuse truck 10 having hopper volume 52 and storage volume 54 of equal width (i.e., for a full-width refuse vehicle, etc.), according to an exemplary embodiment. A full-width refuse vehicle may have opening 92 from hopper volume 52 to storage volume 54 equal to the full width of the refuse vehicle. As shown in FIG. 7, ejector system 40 defines an axis, shown as axis 100, about which packer 44 rotates through swing arc 45. The couplings 47 pivotally and fixedly couple an end of the packer 44 to the wall 42 such that the packer 44 pivots about the axis 100. Packer 44 is in closed position 46, according to the configuration shown in FIG. 7. Ejector system 40 includes actuator assembly 90 positioned to rotate packer 44. Actuator assembly 90 is coupled to wall 42 at a first attachment point, shown as first attachment point 102, and coupled to packer 44 at a second attachment point, shown as second attachment point 104. First attachment point 102 and/or second attachment point 104 may be brackets, clevises, etc. In some embodiments, actuator assembly 90 is coupled to wall 42 and packer 44 at first attachment point 102 and second attachment point 104, respectively, by welding, bolting, etc. As shown in FIG. 7, actuator assembly 90 includes a pair of linear actuators (e.g., cylinders, etc.) configured to extend and retract to selectively reposition packer 44. When actuator assembly 90 is actuated for extension, one or more rods of the cylinders may be extended, and packer 44 may be rotated into closed position 46. When actuator assembly 90 is actuated for retraction, one or more rods of the cylinders may be retracted, and packer 44 may be rotated into open position 48.

Wall 42 may be a lightweight structure designed to reduce the weight of a refuse vehicle. According to an exemplary embodiment, wall 42 includes a plurality of assembled plates. Such plates may be metal (e.g., steel, aluminum, etc.), a polymeric material, or a composite material, among other alternatives. Wall 42 may include a plurality of steel plates welded together. In other embodiments, wall 42 is manufactured according to a different process (e.g., a cast assembly, plates bolted or otherwise coupled together, etc.).

Wall 42 may slide within storage volume 54 of body 14 (e.g., for compaction of the refuse, to retract, etc.). Compaction of refuse imparts various forces and moments on wall 42. By way of example, twisting moments may occur about a first vertical axis 107, a second vertical axis 108, or a third vertical axis 109. While first vertical axis 107, second vertical axis 108, and third vertical axis 109 have been specifically described, twisting moments may occur about still other axes. Compaction may also impart tipping moments on wall 42. The tipping moments may occur about axis 100 or about still other axes.

Refuse may be unevenly distributed within the collection chamber of the body assembly (e.g., due to loading from only one lateral side of the refuse truck). By way of example, a first lateral side of hopper volume 52 may have refuse therein whereas a second lateral side of the hopper volume 52 may be relatively free of refuse. Uneven distribution of the refuse may also occur due to the composition of the refuse whereby a first lateral side of hopper volume 52 includes stiff materials (e.g., metal products, plastic products, etc.) and a second lateral side of hopper volume 52 includes pliable materials (e.g., paper products, etc.). In one embodiment, ejector system 40 includes a second actuator assembly configured to reposition wall 42 and/or packer 44 along rails 80. Extension of the second actuator assembly applies compaction forces to the first and second lateral sides of wall 42. The application of such compaction forces to unevenly distributed refuse may cause a twisting moment about at least one of first vertical axis 107, second vertical axis 108, and third vertical axis 109 (e.g., relatively dense refuse on the side of wall 42 at second vertical axis 108 may cause a twisting moment about second vertical axis 108).

As shown in FIG. 7, wall 42 has a first side edge 113, a second side edge 114, an uppermost edge 115, and a lowermost edge 116. According to an exemplary embodiment, uppermost edge 115 is disposed along panel 71 of body 14. Uppermost edge 115 may be convex, and may have a shape (e.g., curvature, etc.) that corresponds with the shape of panel 71. First side edge 113 and second side edge 114 may have a shape (e.g., curvature, etc.) that corresponds with panel 73 and panel 72, respectively.

Wall 42 may partially define opening 92. As shown in FIG. 7, lowermost edge 116 defines the upper boundary, shown as upper boundary 122, of opening 92. In some embodiments, wall 42 does not extend to the floor 70 of body 14. Opening 92 also has a first side boundary, shown as side boundary 120, a second side boundary, shown as side boundary 121, and a lower boundary 123. According to an exemplary embodiment, opening 92 has a generally rectangular shape. Side boundary 120, side boundary 121, and lower boundary 123 are disposed along panel 73, panel 72, and panel 71, respectively, according to an exemplary embodiment. Opening 92 may encompass the area in a cross section, orthogonal to longitudinal axis 60, of storage volume 54. In other embodiments, opening 92 has another shape (e.g., circular, trapezoidal, etc.).

Packer 44 may extend from upper boundary 122 to panel 70, such that a lowermost edge, shown as edge 110, of packer 44 is disposed along the floor of body 14 when selectively reconfigured into closed position 46. When in the configuration shown in FIG. 7, packer 44 may completely cover opening 92. As shown in FIG. 7, packer 44 has a first side edge, shown as edge 111, and a second side edge, shown as edge 112. Edge 111 and edge 112 may be disposed along panel 72 and panel 73 of body 14. According to an exemplary embodiment, edge 110, edge 111, and edge 112 are linear (e.g., straight, etc.). Packer 44 may have a generally rectangular shape. In another embodiment, edge 110, edge 111, and edge 112 are shaped (e.g., curved, etc.) to correspond with the shape (e.g., curvature, etc.) of panel 70, panel 73, and panel 72, respectively.

Figure 8:
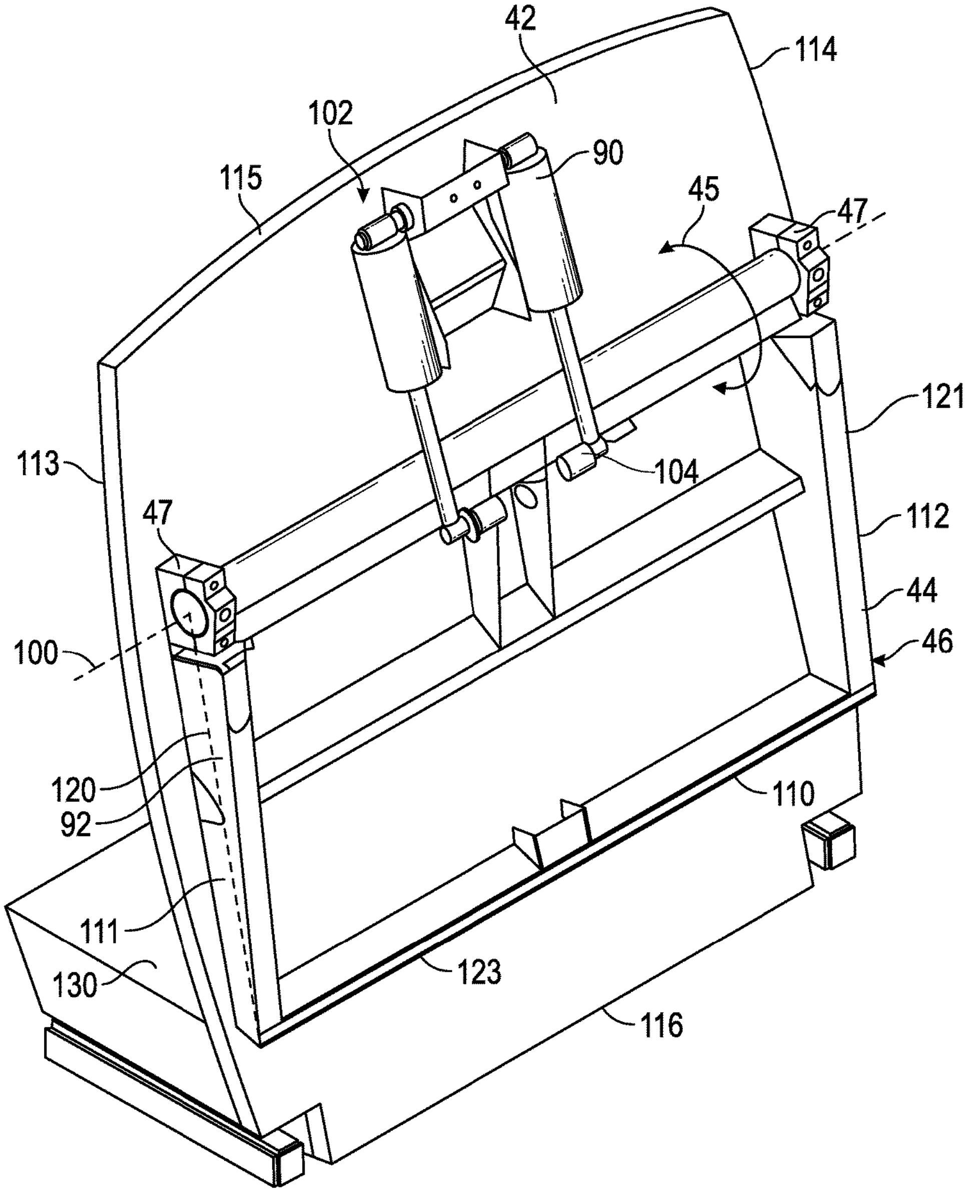

According to the alternative embodiments shown in FIG. 8, ejector system 40 is configured for use with a full-width refuse vehicle. According to the alternative embodiment shown in FIGS. 9-11, ejector system 40 is configured for use with a reduced-width refuse vehicle where hopper volume 52 is narrower than storage volume 54. Opening 92 and packer 44 have a width and/or position configured to facilitate such uses.

Figure 9:
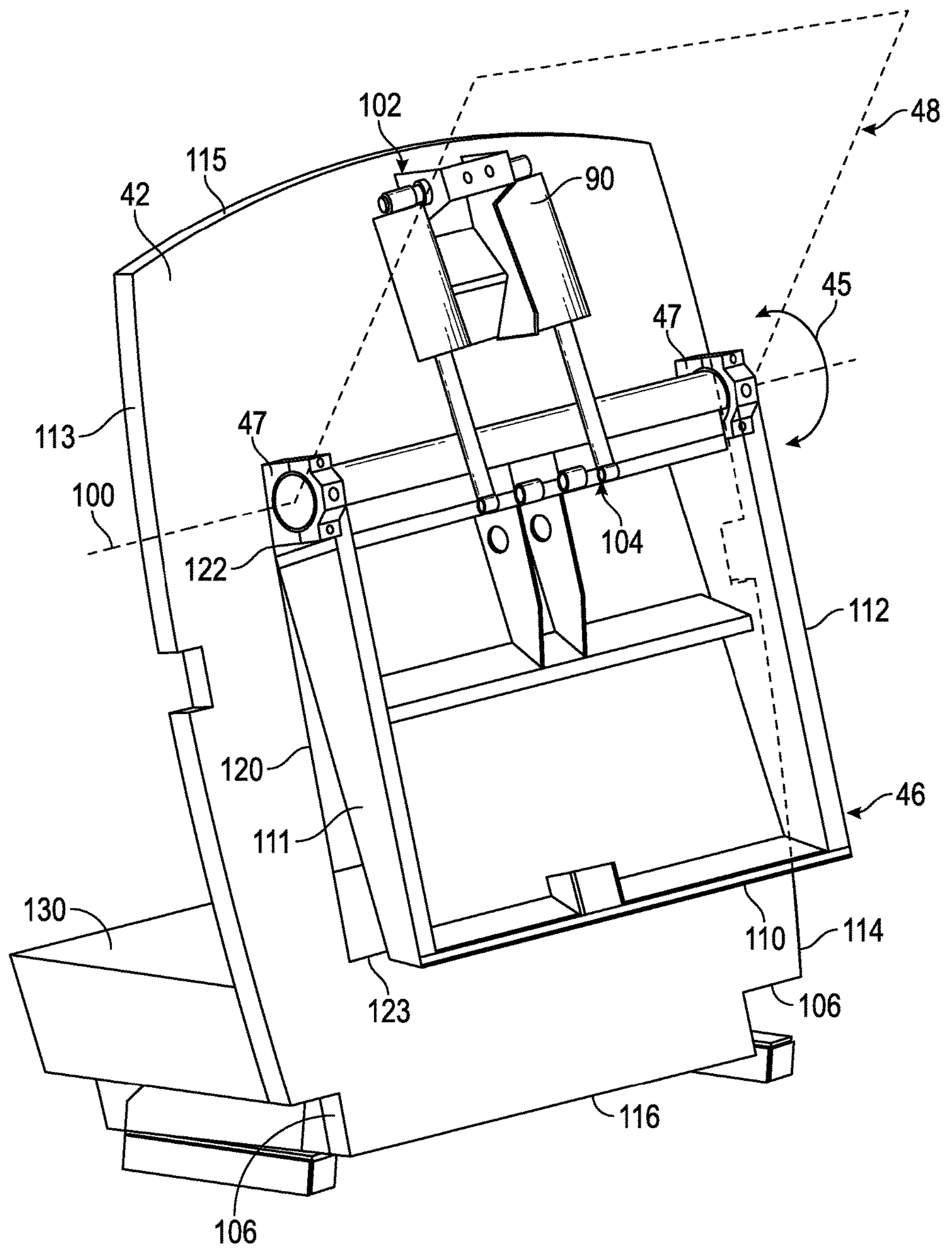
Figure 10:
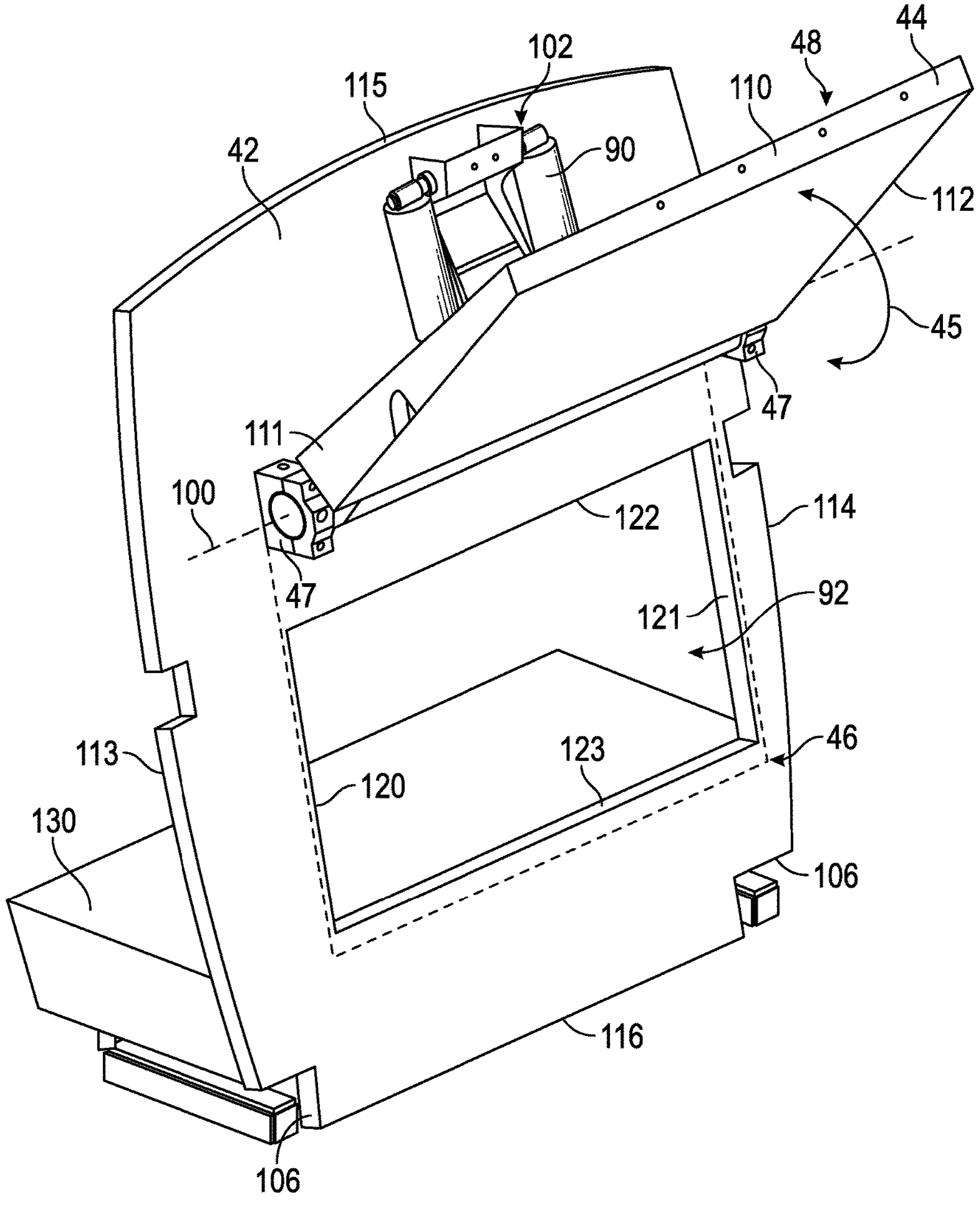

In one embodiment, hopper volume 52 has an elevated floor height relative to storage volume 54 (i.e., the floor of hopper volume 52 may be further from a ground surface than the floor of storage volume 54, etc.). As shown in FIGS. 8-10, ejector system 40 includes a step, shown as step 130. Step 130 may be disposed within storage volume 54. Step 130 may have a height equal to the difference between the floor height of hopper volume 52 and the floor height of storage volume 54 such that an upper surface of step 130 is coplanar with lower boundary 123 of opening 92. As shown in FIG. 8, packer 44 is selectively reconfigured into closed position 46. As shown in FIG. 9, packer 44 is transitioning from closed position 46 to open position 48. As shown in FIG. 10, packer 44 is selectively reconfigured into open position 48. Uppermost edge 115 of wall 42 is disposed along panel 71 of body 14, and lowermost edge 116 of wall 42 is disposed along panel 70 of body 14, such that wall 42 extends from the ceiling to the floor of body 14. Opening 92 may be defined between uppermost edge 115, lowermost edge 116, first side edge 113, and second side edge 114 (i.e., opening 92 may be entirely defined within or by wall 42, etc.). First side edge 113 and second side edge 114 are directly disposed along panel 73 and panel 72, respectively, according to an exemplary embodiment.

As shown in FIGS. 8-10, side boundary 120 and side boundary 121 of opening 92 are inset from first side edge 113 and second side edge 114, respectively, such that opening 92 is narrower by an inset relative to the width of storage volume 54. Upper boundary 122 is vertically offset from the plane, extending through axis 100, at which the uppermost edge of packer 44 interfaces with wall 42, according to the embodiments of FIGS. 8-10. In an exemplary embodiment, upper boundary 122 is below the height at which an uppermost edge of packer 44 interfaces with wall 42, such that packer 44 extends downward from above opening 92 (e.g., when packer 44 is selectively reconfigured into closed position 46. In other embodiments, upper boundary 122 may be at or above the point at which the uppermost edge of packer 44 interfaces with wall 42. Lower boundary 123 of opening 92 is shown to be vertically offset from lowermost edge 116 such that opening 92 is spaced an offset distance from the floor of storage volume 54 and/or hopper volume 52. According to the embodiment of FIG. 8, opening 92 is laterally centered with respect to wall 42, storage volume 54, and/or hopper volume 52. According to the embodiment of FIGS. 9 and 10, opening 92 is laterally offset relative to a centerline of wall 42, storage volume 54, and/or hopper volume 52. Such a lateral offset provides one side of wall 42 that is wider than the other side of wall 42. The wider portion of wall 42 may eject refuse from storage volume 54 where body 14 has hopper volume 52 that is narrower than storage volume 54 (e.g., sweeping the portion of storage volume 54 that would not be swept by an ejector having a width equal hopper volume 52.

Edge 110 of packer 44 extends to or below lower boundary 123 of opening 92, according to an exemplary embodiment, such that packer 44 at least partially covers opening 92 when selectively reconfigured into closed position 46. In some embodiments, packer 44 entirely covers opening 92 when selectively reconfigured into closed position 46. Edge 110 of packer 44 is offset a vertical distance above panel 70 when selectively reconfigured into closed position 46, according to an exemplary embodiment, such that packer 44 is elevated from panel 70. Body 14 having such a ejector system 40 may be particularly suited for collecting organic materials.

Figure 11:
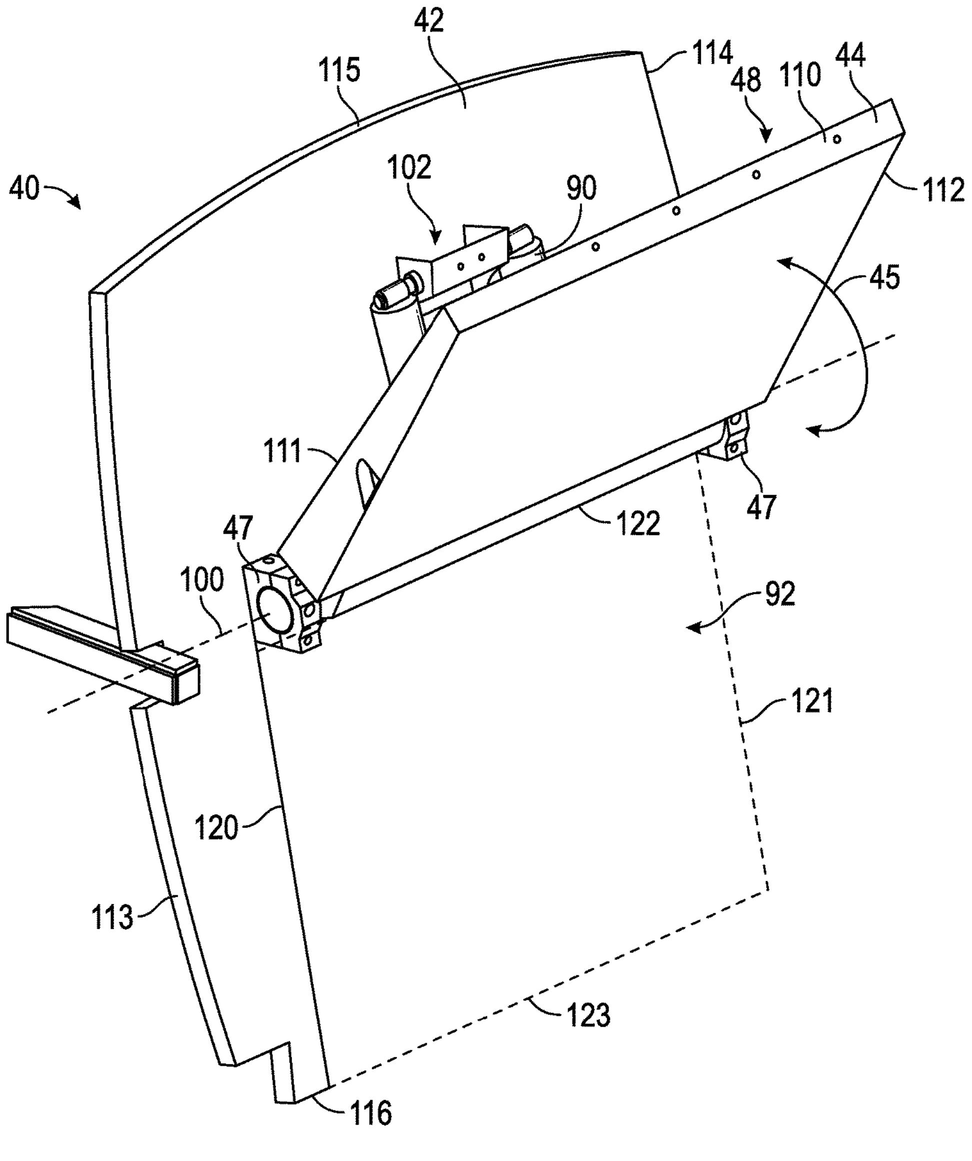

Referring next to FIG. 11, ejector system 40 for a reduced-width refuse vehicle has opening 92 defined by wall 42 and by the sidewalls and/or floor of body 14, according to an exemplary embodiment. As shown in FIG. 11, packer 44 is disposed in open position 48. Uppermost edge 115 may be disposed along panel 71 of body 14, and lowermost edge 116 may be disposed along panel 70 of body 14, such that wall 42 extends from the ceiling to the floor of body 14. First side edge 113 and second side edge 114 may be disposed along panel 73 and panel 72, respectively.

Side boundary 120 of opening 92 is laterally offset from first side edge 113, according to the exemplary embodiment shown in FIG. 11. In one embodiment, side boundary 120 has a lateral position that corresponds with a lateral position of panel 76, which defines a side panel of hopper volume 52. Side boundary 121 of opening 92 may have a lateral position that corresponds with the lateral position of second side edge 114 such that opening 92 extends from one panel 76 of hopper volume 52 to the other panel 72 of hopper volume 52. Opening 92 may thereby have a width equal to the width of hopper volume 52. Upper boundary 122 of opening 92 may be disposed within a plane that extends through axis 100. The uppermost edge of packer 44 may interface with wall 42 at the plane. Lower boundary 123 of opening 92 may be disposed along lowermost edge 116 and a floor panel of hopper volume 52 and/or storage volume 54 such that opening 92 extends from the plane at which the uppermost edge of packer 44 interfaces with wall 42 to one or more floors (e.g., panel 70) of body 14.

Figure 12B:
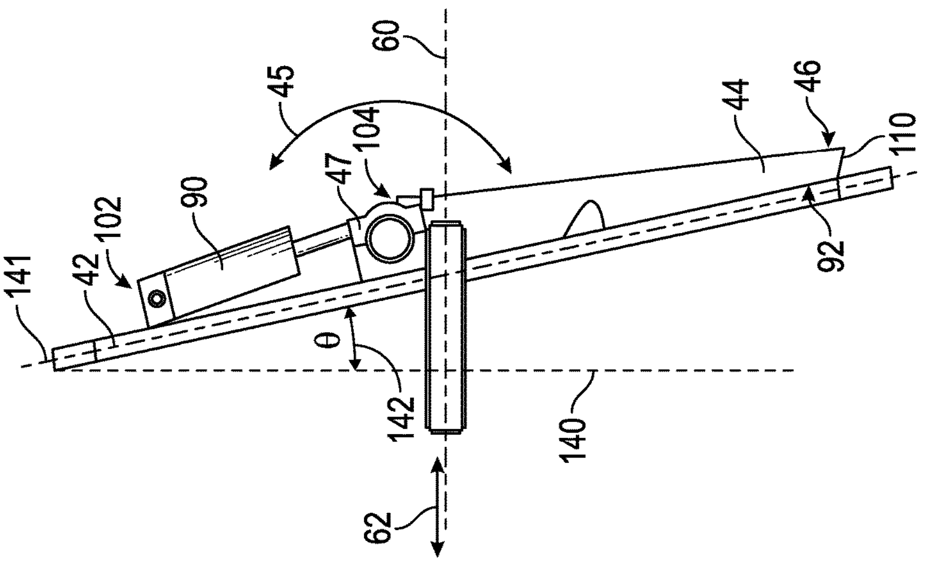
FIG. 12B is a side view of the ejector of FIG. 3 with a panel thereof in a closed position, according to an exemplary embodiment.
Figure 12A:
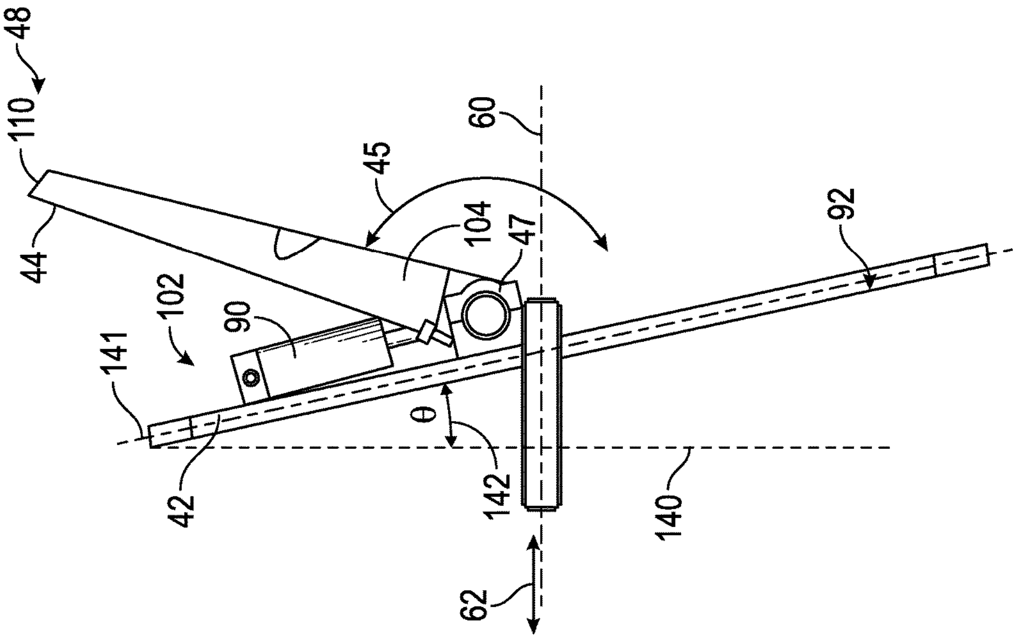
FIG. 12A is a side view of the ejector of FIG. 3 with a panel thereof in an open position, according to an exemplary embodiment.

As shown in FIGS. 12A and 12B, wall 42 of ejector system 40 is disposed within a plane 141. In other embodiments, at least a portion of wall 42 is disposed within plane 141. Plane 141 is angularly offset from plane 140, according to the exemplary embodiment shown in FIGS. 12 and 12B. Plane 140 may be orthogonal to longitudinal axis 60. As shown in FIGS. 12A and 12B, plane 141 is angularly offset an amount 142 equal to θ relative to plane 140. The amount 142 may be any amount θ and may be measured in degrees, radians, etc. In some embodiments, packer 44 is disposed within a plane that is parallel to plane 141 when selectively reconfigured into closed position 46. In other embodiments, packer 44 is disposed within a plane that is angularly offset relative to plane 141 when selectively reconfigured into closed position 46.

Figure 13:
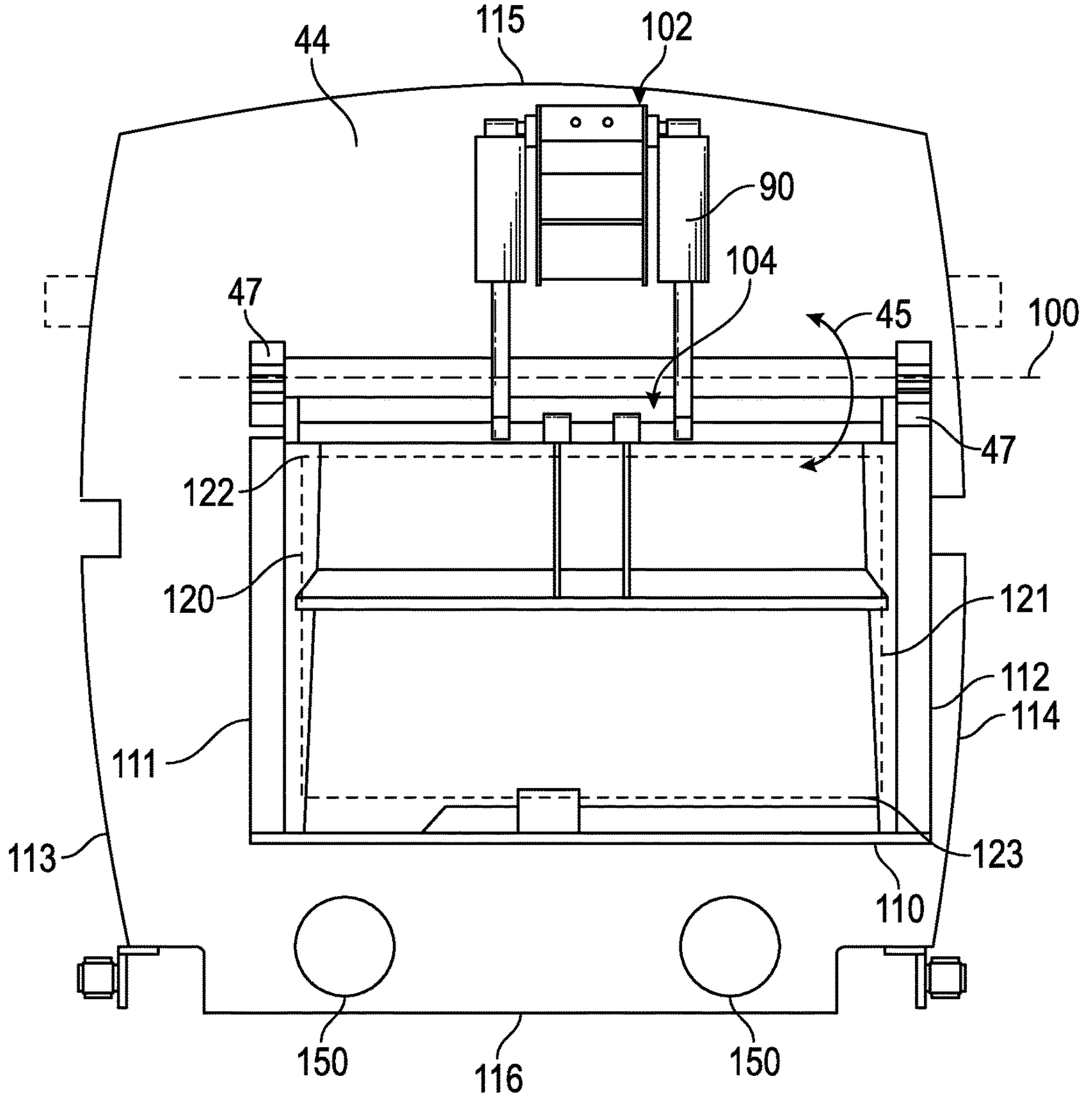
FIG. 13 is a front perspective view of the ejector of FIG. 3, according to an exemplary embodiment.
Figure 14:
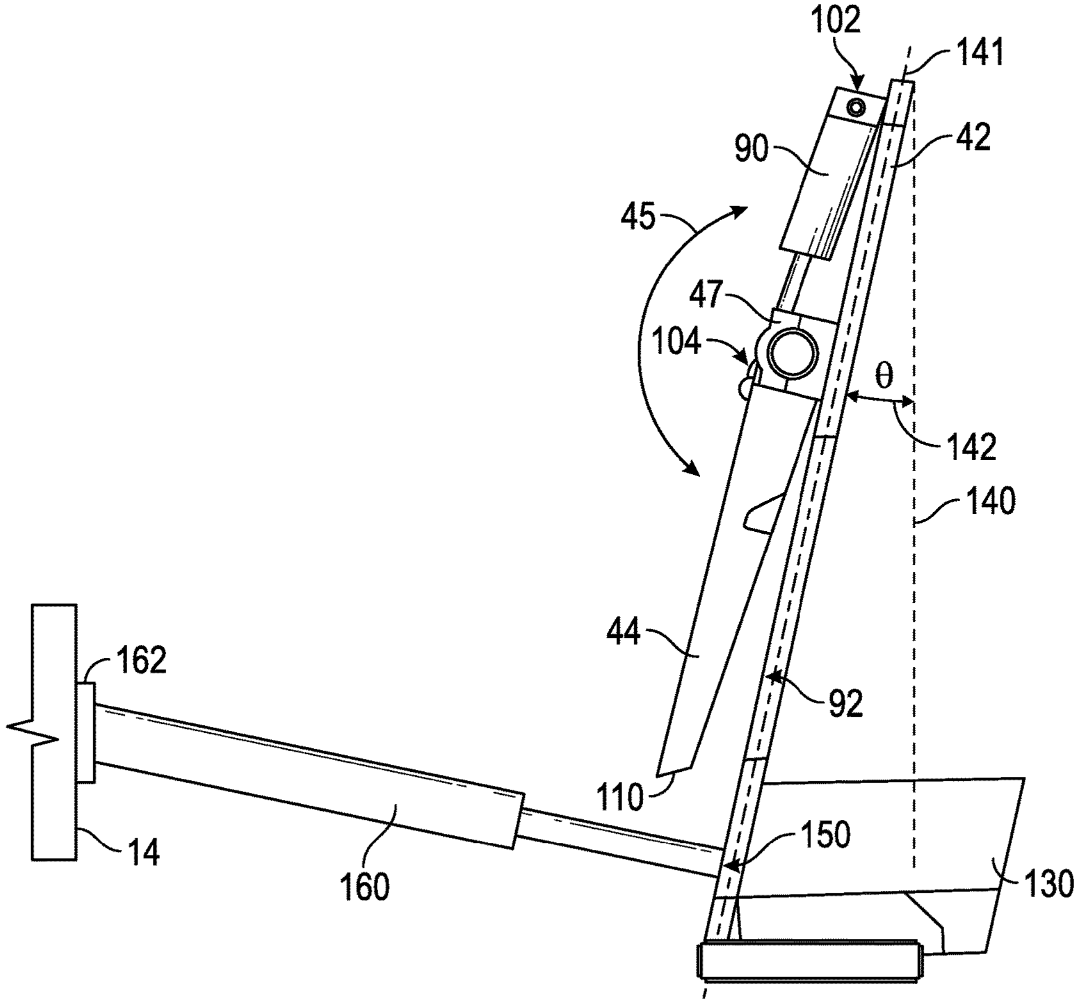
FIG. 14 is a side view of the ejector of FIG. 3 with an actuator assembly, according to an exemplary embodiment.

Referring next to the exemplary embodiment of FIGS. 13 and 14, ejector system 40 includes a first attachment point 150 and a second attachment point 150 for a pair of actuators (e.g., linear actuators, cylinders, etc.), shown as actuators 160, of a second actuator assembly. The second actuator assembly may be configured to reposition ejector system 40 along rails 80 (e.g., to compact refuse, etc.). In some embodiments, attachment points 150 are disposed on wall 42 and positioned below opening 92. In other embodiments, the second actuator assembly includes only one actuator 160 and only one attachment point 150. In yet other embodiments, the second actuator assembly includes three or more actuators 160 and three or more attachment points 150. According to an exemplary embodiment, attachment points 150 are disposed behind a mid-post of body 14. The second actuator assembly may thereby have shorter actuators 160 due to the position of attachment points 150 behind the mid-point. In some embodiments, the location of the actuators 160 and/or attachment points 150 facilitates eliminating one or more cylinder stages from actuators 160 of the second actuator assembly.

As shown in FIG. 14, ejector system 40 actuator 160 is coupled to wall 42 at attachment point 150. Actuator 160 is coupled to body 14 of the refuse vehicle with an attachment, shown as attachment 162. In some embodiments, attachment 162 is a bracket, clevis, eyelet, etc. In other embodiments, actuator 160 is otherwise coupled to body 14 (e.g., welded, bolted, etc.).

The construction of the body assembly and compactor is intended to reduce the overall weight of the refuse vehicle, thereby allowing for an increase in the maximum refuse carrying capacity without exceeding gross vehicle weight regulations imposed on some roadways. A reduced number of components simplifies fixture designs and increases the ease of manufacturing. Support below the side plates of the ejector instead of in a cantilevered position allows for the direct transfer of vertical loads into the frame of the vehicle thereby reducing stresses on the ejector and the body.

The construction and arrangements of the refuse vehicle, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A refuse vehicle, comprising:

a chassis including a cab positioned at one end of a frame; and a body assembly coupled to the chassis and disposed behind the cab, the body assembly comprising:

a plurality of panels configured to contain a volume of refuse therein, wherein the plurality of panels define a longitudinal direction, a hopper volume, and a storage volume;

a ramp disposed within the hopper volume; and an ejector configured to fully eject refuse from the storage volume, the ejector comprising:

a wall movably coupled to the plurality of panels and at least partially defining an opening within a plane, wherein the wall is movable within the storage volume; and a coupling pivotally and fixedly coupling an end of a panel to the wall such that the panel pivots about an axis, wherein the panel is selectively rotatable relative to the wall between a closed position and an open position, the panel spanning the opening when selectively rotated into the closed position and angularly offset relative to the plane of the opening when selectively rotated into the open position;

wherein the ramp is positioned to direct refuse from the hopper volume toward the opening such that the refuse is compacted into the storage volume, through the opening, as the panel rotates from the open position to the closed position; and wherein the wall comprises an uppermost edge and a side edge, and wherein at least one of (a) the uppermost edge of the wall is disposed vertically above an uppermost edge of the panel when the panel is selectively reconfigured into the closed position and (b) the side edge of the wall is laterally spaced outward relative to a side edge of the panel.

2. The refuse vehicle of claim 1, further comprising an actuator positioned to rotate the panel between the closed position and the open position, wherein the actuator is coupled to the wall of the ejector at a first attachment point and coupled to the panel of the ejector at a second attachment point such that the ejector and the actuator form a self-contained ejection system.

3. The refuse vehicle of claim 2, the actuator defining a first actuator, further comprising a second actuator positioned to translate the ejector along the longitudinal direction, wherein the first actuator and the second actuator are configured to engage the panel and the wall such that both cooperatively translate to fully eject refuse from the storage volume.

4. The refuse vehicle of claim 1, wherein the plurality of panels includes a first lower panel that defines a floor of the storage volume and a second lower panel that defines a floor of the hopper volume, wherein the panel of the ejector is elevated relative to at least one of the floor of the storage volume and the floor of the hopper volume when in the closed position.

5. The refuse vehicle of claim 4, wherein the ramp extends longitudinally through the hopper volume and thereby cooperates with the wall of the ejector to define the opening.

6. The refuse vehicle of claim 4, wherein the floor of the hopper volume cooperates with the wall of the ejector to define the opening.

7. The refuse vehicle of claim 4, wherein an edge of the panel of the ejector is disposed along at least one of the ramp and the floor of the hopper volume when the panel of the ejector is selectively rotated into the closed position.

8. The refuse vehicle of claim 7, wherein at least one of the plurality of panels that defines the hopper volume is inset relative to at least one of the plurality of panels that defines the storage volume such that the body assembly defines a space between the storage volume and the cab, alongside the hopper volume, that is configured to receive a container handling system.

9. The refuse vehicle of claim 8, further comprising a container handling system configured to lift and dump refuse from a refuse container into the hopper volume, wherein the container handling system is positioned within the space defined by the body assembly, wherein the container handling system is configured to interface with refuse containers disposed to a side of the body assembly such that the refuse vehicle is a side-loading refuse vehicle.

10. The refuse vehicle of claim 7, wherein the hopper volume has a first width and the storage volume has a second width equal to the first width.

11. The refuse vehicle of claim 10, further comprising a container handling system configured to lift and dump refuse from a refuse container into the hopper volume, wherein the container handling system is configured to interface with refuse containers disposed forward of the cab such that the refuse vehicle is a front-loading refuse vehicle.

12. A body assembly for a refuse vehicle, comprising:

a plurality of panels configured to contain a volume of refuse therein, wherein the plurality of panels define a longitudinal direction, a hopper volume, and a storage volume;

a ramp disposed within the hopper volume; and an ejector configured to fully eject refuse from the storage volume, the ejector comprising:

a wall movably coupled to the plurality of panels and at least partially defining an opening within a plane, wherein the wall is movable within the storage volume; and a coupling pivotally and fixedly coupling an end of a panel to the wall such that the panel pivots about an axis, wherein the panel is selectively rotatable relative to the wall between a closed position and an open position, the panel spanning the opening when selectively rotated into the closed position and angularly offset relative to the plane of the opening when selectively rotated into the open position;

wherein the ramp is positioned to direct refuse from the hopper volume toward the opening such that the refuse is compacted into the storage volume, through the opening, as the panel rotates from the open position to the closed position; and wherein the wall comprises an uppermost edge and a side edge, and wherein at least one of (a) the uppermost edge of the wall is disposed vertically above an uppermost edge of the panel when the panel is selectively reconfigured into the closed position and (b) the side edge of the wall is laterally spaced outward relative to a side edge of the panel.

13. The refuse vehicle of claim 12, further comprising an actuator positioned to rotate the panel between the closed position and the open position, wherein the actuator is coupled to the wall of the ejector at a first attachment point and coupled to the panel of the ejector at a second attachment point such that the ejector and the actuator form a self-contained ejection system.

14. The refuse vehicle of claim 13, the actuator defining a first actuator, further comprising a second actuator positioned to translate the ejector along the longitudinal direction, wherein the first actuator and the second actuator are configured to engage the panel and the wall such that both cooperatively translate to fully eject refuse from the storage volume.

15. The refuse vehicle of claim 12, wherein the plurality of panels includes a first lower panel that defines a floor of the storage volume and a second lower panel that defines a floor of the hopper volume, wherein the panel of the ejector is elevated relative to at least one of the floor of the storage volume and the floor of the hopper volume when in the closed position.

16. The refuse vehicle of claim 15, wherein an edge of the panel of the ejector is disposed along at least one of the ramp and the floor of the hopper volume when the panel of the ejector is selectively rotated into the closed position.

17. The refuse vehicle of claim 16, wherein at least one of the plurality of panels that defines the hopper volume is inset relative to at least one of the plurality of panels that defines the storage volume such that the body assembly defines a space alongside the hopper volume that is configured to receive a container handling system.

18. The refuse vehicle of claim 17, further comprising a container handling system configured to lift and dump refuse from a refuse container into the hopper volume, wherein the container handling system is positioned within the space defined by the body assembly, wherein the container handling system is configured to interface with refuse containers disposed to a side of the body assembly such that the refuse vehicle is a side-loading refuse vehicle.

19. The refuse vehicle of claim 16, further comprising a container handling system configured to lift and dump refuse from a refuse container into the hopper volume, wherein the container handling system is configured to interface with refuse containers disposed forward of the body assembly is a front-loading refuse vehicle, wherein the hopper volume has a first width and the storage volume has a second width equal to the first width.

20. An ejector for a refuse vehicle, comprising:

a wall at least partially defining an opening within a plane;

coupling pivotally and fixedly coupling an end of a panel to the wall such that the panel pivots about an axis, wherein the panel is selectively rotatable relative to the wall between a closed position and an open position, the panel spanning the opening when selectively rotated into the closed position and angularly offset relative to the plane of the opening when selectively rotated into the open position;

an actuator positioned to rotate the panel between the closed position and the open position, wherein the actuator is coupled to the wall at a first attachment point and coupled to the panel at a second attachment point such that the wall, the panel, and the actuator form a self-contained ejection system;

wherein the wall comprises an uppermost edge and a side edge, and wherein at least one of (a) the uppermost edge of the wall is disposed vertically above an uppermost edge of the panel when the panel is selectively reconfigured into the closed position and (b) the side edge of the wall is laterally spaced outward relative to a side edge of the panel.

* * * * *